United States Patent
Tang

(10) Patent No.: US 11,974,306 B2
(45) Date of Patent: Apr. 30, 2024

(54) METHOD AND DEVICE FOR SIGNAL TRANSMISSION

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 592 days.

(21) Appl. No.: 17/169,279

(22) Filed: Feb. 5, 2021

(65) Prior Publication Data

US 2021/0160883 A1 May 27, 2021

Related U.S. Application Data

(63) Continuation of application No. PCT/CN2018/100900, filed on Aug. 16, 2018.

(51) Int. Cl.
*H04W 72/53* (2023.01)
*H04W 72/044* (2023.01)
*H04W 72/23* (2023.01)

(52) U.S. Cl.
CPC ......... *H04W 72/53* (2023.01); *H04W 72/044* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2016/0212625 A1 | 7/2016 | Damnjanovic et al. | |
| 2018/0035332 A1 | 2/2018 | Agiwal et al. | |
| 2018/0199359 A1 | 7/2018 | Cao | |
| 2020/0328866 A1* | 10/2020 | Du | H04L 5/001 |
| 2021/0160917 A1* | 5/2021 | Goto | H04W 72/23 |

FOREIGN PATENT DOCUMENTS

| | | |
|---|---|---|
| CN | 103650544 A | 3/2014 |
| CN | 107113889 A | 8/2017 |
| CN | 107959971 A | 4/2018 |
| CN | 108173633 A | 6/2018 |

(Continued)

OTHER PUBLICATIONS

Huawei et al, "On pre-emption indication for DL multiplexing of URLLC and eMBB", 3GPP TSG RAN WG1 Ad Hoc Meeting R1-1715409, Nagoya, Japan, Sep. 18-21, 2017 (15 pages).

(Continued)

*Primary Examiner* — Saumit Shah
(74) *Attorney, Agent, or Firm* — Perkins Coie LLP

(57) ABSTRACT

A method and device for signal transmission are provided. The method includes operations as follows. A terminal receives a second signal. The second signal is configured to indicate the first transmission resource, and the first transmission resource comprises at least one of a time-domain resource, a frequency-domain resource or a code-domain resource. The terminal receives a first signal on the first transmission resource. The first signal is configured to instruct to stop uplink transmission.

20 Claims, 5 Drawing Sheets

A terminal determines a first transmission resource and receives a first signal on the first transmission resource, the first signal is configured to instruct to stop uplink transmission — 201

(56) References Cited

FOREIGN PATENT DOCUMENTS

| WO | 2011093642 A2 | 8/2011 | |
| WO | WO-2018231621 A1 * | 12/2018 | ........... H04L 5/0053 |

OTHER PUBLICATIONS

Second Office Action of the European application No. 18929858.1, dated Jul. 28, 2022 (9 pages).
First Office Action of the Chinese application No. 202110402610.4, dated Aug. 23, 2022 (22 pages).
Written Opinion of the International Search Authority in the international application No. PCT/CN2018/100900, dated Apr. 28, 2019. 7 pages with English translation.
First Office Action of the European application No. 18929858.1, dated Feb. 24, 2022. 8 pages.
Office Action of the Indian application No. 202117007385, dated Jan. 17, 2022. 9 pages with English translation.
VIVO: "UL inter-UE Tx prioritization for URLLC", 3GPP Draft; R1-1808249, vol. RAN WG1. Gothenburg, Sweden; Aug. 10, 2018, XP051515634, Retrieved from the Internet: URL:http://www.3gpp.org/ftp/tsg%5Fran/WG1 %5FRL 1 /TSGR1 %5F94/Docs/R 1%2D1808249%2Ezip. 8 pages.
FUJITSU: "Discussion on Preemption Indicator Design", 3GPP Draft; R1-1707261, vol. RAN WG1. Hangzhou; May 14, 2017, XP051272474, Retrieved from the Internet:URL:http://www.3gpp.org/ftp/Meetings_3GPP SYNC/RAN1/Docs/. 5 pages.
Supplementary European Search Report in the European application No. 18929858.1, dated Jun. 24, 2021. 10 pages.
VIVO. "Multiplexing Data with Different Transmission Durations" 3GPP TSG RAN WGI Meeting 90bis R1-1717502, Oct. 13, 2017 (Oct. 13, 2017), sections 2-3.
LG Electronics. "Discussion on Indication Method for Impacted Resources for Downlink" 3GPP TSG RAN WG1 Meeting #88bis R1-1704922, Apr. 7, 2017 (Apr. 7, 2017), entire document.
International Search Report in the international application No. PCT/CN2018/100900, dated Apr. 28, 2019.
Second Office Action of the Chinese application No. 202110402610.4, dated Oct. 21, 2022. 17 pages with English translation.

* cited by examiner

| A terminal determines a first transmission resource and receives a first signal on the first transmission resource, the first signal is configured to instruct to stop uplink transmission | 201 |

| A base station sends a first signal on a first transmission resource, the first signal is configured to instruct a terminal to stop uplink transmission | 301 |

METHOD AND DEVICE FOR SIGNAL TRANSMISSION

CROSS-REFERENCE TO RELATED APPLICATIONS

This is a continuation application of International Patent Application No. PCT/CN2018/100900, filed on Aug. 16, 2018, the disclosure of which is hereby incorporated by reference in its entirety.

BACKGROUND

At present, an Ultra-Reliable Low Latency Communication (URLLC) service is introduced into New Radio (NR) of the 5th Generation (5G) mobile communication system, and the service has the characteristic that ultra-reliable (for example, 99.999%) transmission is implemented in an extreme latency (for example, 1 ms). For achieving the purpose, a preemption mechanism is introduced to Downlink (DL), that is, the URLLC service is inserted into a transmission process of an Enhance Mobile Broadband (eMBB) service, as shown in FIG. 1. Since eMBB User Equipment (UE) (a terminal for transmitting the eMBB service) does not know that the URLLC service is inserted, URLLC data may be demodulated as eMBB data, which results in serious influence to demodulation performance of the eMBB data. For reducing the influence of the URLLC data on the eMBB data, a preemption indicator is introduced. The preemption indicator is configured to indicate, to the terminal, resources occupied by the URLLC data, and the preemption indicator indicates a preemption condition of a time/frequency-domain resource in a bitmap manner. The preemption indicator is generated after preemption, and for reducing a signaling overhead, a frequency of sending the preemption indicator may be lower.

For uplink transmission of a terminal side, a terminal timely stops uplink transmission of eMBB data according to a transmission stopping signal of a network side. Therefore, the terminal is required to timely detect the transmission stopping signal, but frequently detecting the transmission stopping signal may inevitably result in an increase of the power consumption and complexity of the terminal.

SUMMARY

The embodiments of the disclosure relate to the technical field of mobile communication, and particularly to a method and device for signal transmission.

A first aspect of the embodiments of the disclosure provides a method for signal transmission, which may include the following operation.

A terminal receives a second signal. The second signal is configured to indicate a first transmission resource, and the first transmission resource comprises at least one of a time-domain resource, a frequency-domain resource or a code-domain resource. The terminal receives a first signal on the first transmission resource. The first signal is configured to instruct to stop uplink transmission.

A second aspect of the embodiments of the disclosure provides a method for signal transmission, which may include the following operation.

A base station sends a second signal. The second signal is configured to indicate a first transmission resource, and the first transmission resource comprises at least one of a time-domain resource, a frequency-domain resource or a code-domain resource. The base station sends a first signal on the first transmission resource. The first signal is configured to instruct a terminal to stop uplink transmission.

A third aspect of the embodiments of the disclosure provides a terminal, which may include a processor, and a memory configured to store a computer program, and a transceiver. The processor may be configured to call and run the computer program stored in the memory to control the transceiver to: receive a second signal, the second signal being configured to indicate the first transmission resource, and the first transmission resource comprising at least one of a time-domain resource, a frequency-domain resource or a code-domain resource; and receive a first signal on the first transmission resource, the first signal being configured to instruct to stop uplink transmission.

BRIEF DESCRIPTION OF THE DRAWINGS

The drawings described herein are adopted to provide a further understanding to the disclosure and form a part of the disclosure. Schematic embodiments of the disclosure and descriptions thereof are adopted to explain the disclosure and not intended to form improper limits to the disclosure. In the drawings.

DETAILED DESCRIPTION

The technical solutions in the embodiments of the disclosure are described below in combination with the drawings in the embodiments of the disclosure. Apparently, the described embodiments are only a part rather than all of the embodiments of the disclosure. All other embodiments obtained by those skilled in the art on the basis of the embodiments in the disclosure without paying creative work fall within the scope of protection of the disclosure.

The technical solutions of the embodiments of the disclosure may be applied to various communication systems such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a 5th-Generation (5G) system.

Figures 1, 2, 3:
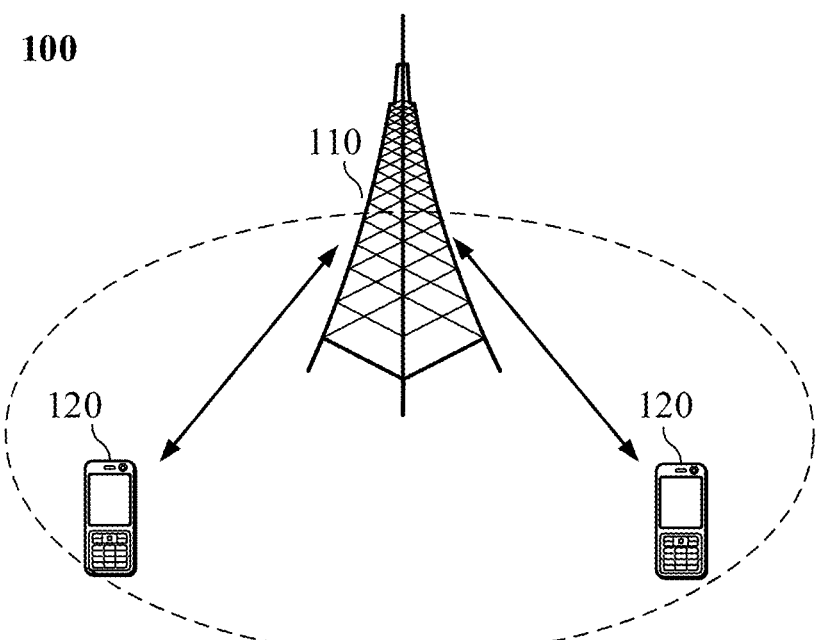
FIG. 1 is a schematic diagram of architecture of a communication system according to an embodiment of the disclosure.
FIG. 2 is a first flowchart of a method for signal transmission according to an embodiment of the disclosure.
FIG. 3 is a second flowchart of a method for signal transmission according to an embodiment of the disclosure.

Exemplarily, a communication system 100 in the embodiments of the disclosure may be illustrated in FIG. 1 and may include a network device 110. The network device 110 may be a device communicating with a terminal device 120 (or referred to as a communication terminal or a terminal). The network device 110 may provide communication coverage for a particular geographical area and communicate with a terminal device located in the coverage. Optionally, the network device 110 may be a base station (a Base Transceiver Station (BTS)) in a GSM system or a CDMA system, a base station (a NodeB (NB)) in a WCDMA system, an evolutional base station (an Evolutional Node B (eNB or eNodeB)) in an LTE system, a wireless controller in a Cloud Radio Access Network (CRAN). Alternatively, the network device may be a mobile exchange center, a relay station, an access point, an on-board device, a wearable device, a hub, a switch, a bridge, a router, a network side device in a 5G network, a network device in a future evolutional Public Land Mobile Network (PLMN) or the like.

The communication system 100 further includes at least one terminal device 120 in the coverage of the network device 110. The terminal device used herein includes but is not limited to be connected via a wired line such as a Public Switched Telephone Network (PSTN), a Digital Subscriber Line (DSL), a digital cable, a direct cable, and/or via another data connection or network, and/or via a wireless interface such as a cellular network, a wireless local area network (WLAN), a digital television network like a Digital Video Broadcasting-Handheld (DVB-H) network, a satellite network, an Amplitude Modulation-Frequency Modulation (AM-FM) broadcasting transmitter, and/or via a device, which is configured to receive/send a communication signal, of another terminal device and/or an Internet of Things (IoT) device. The terminal device configured to communicate through the wireless interface may be referred to as "a wireless communication terminal", "a wireless terminal" or "a mobile "terminal". Examples of a mobile terminal include, but are not limited to, a satellite or cellular telephone, a personal communication system (PCS) terminal capable of combining a cellular radio telephone and data processing, faxing and data communication capabilities, a personal digital assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device having a wireless communication function, a computing device, another processing device connected to a wireless modem, an on-board device, a wearable device, a terminal device in the 5G network, a terminal device in the future evolved PLMN or the like.

Optionally, Device to Device (D2D) communication may be performed between the terminal devices 120.

Optionally, the 5G system or the 5G network may also be called a New Radio (NR) system or an NR network.

One network device and two terminals are exemplarily shown in FIG. 1.

Optionally, the communication system 100 may include multiple network devices, and each of the network devices may have other number of terminals in coverage thereof, which is not limited in the embodiments of the disclosure.

Optionally, the communication system 100 may further include another network entity such as a network controller and a mobility management entity, which is not limited in the embodiments of the disclosure.

It is to be understood that a device having a communication function in the network/system in the embodiments of the disclosure may be called a communication device. Taking the communication system 100 shown in FIG. 1 as an example, the communication device may include the network device 110 and terminal 120 having the communication function, and the network device 110 and the terminal 120 may be the specific devices mentioned above and will not be elaborated herein. The communication device may further include other devices in the communication system 100, for example, other network entities like a network controller and a mobility management entity, which is not limited in the embodiments of the disclosure.

It should be understood that the terms "system" and "network" are often used interchangeably herein. The term "and/or" herein only represent an association relationship of associated objects, which means that there may be three relationships. For example, A and/or B can mean: only A exists, both A and B exist, and only B exists. In addition, the character "/" herein generally indicates that there is an "or" relationship between two associated objects.

FIG. 2 is a first flowchart of a method for signal transmission according to an embodiment of the disclosure. As shown in FIG. 2, the method for signal transmission includes the following operation.

In 201, a terminal determines a first transmission resource and receives a first signal on the first transmission resource. The first signal is configured to instruct to stop uplink transmission.

In the embodiment of the disclosure, the terminal may be any device capable of communicating with a network, such as a mobile phone, a tablet computer, a vehicle terminal device and a notebook computer.

In the embodiment of the disclosure, the first transmission resource is a determined transmission resource, and the terminal receives the first signal on the determined transmission resource, thereby stopping uplink transmission. Herein, the terminal receives the first signal only on the determined transmission resource, thereby avoiding blind detection of the terminal for the first signal, and reducing the complexity of the terminal.

In the embodiment of the disclosure, the terminal receives the first signal sent by a base station on the first transmission resource. Herein, the base station may be, but be not limited to, a gNB in 5G.

In an implementation mode, the terminal receives a second signal before the terminal receives the first signal on the first transmission resource. The second signal is configured to indicate the first transmission resource.

Furthermore, the first transmission resource includes at least one of a time-domain resource, a frequency-domain resource or a code-domain resource.

Furthermore, the first transmission resource has a periodic characteristic on a time domain. Herein, the first transmission resource meets the periodic characteristic on the time domain, and a period of the first transmission resource may be 0, infinite or any value. If the period of the first transmission resource is infinite, it is indicated that the first transmission resource appears only once in the time domain. If the period of the first transmission resource is 0, it is indicated that the first transmission resource always appears in the time domain. If the period of the first transmission resource is any value, for example, T, it is indicated that a time interval between two adjacent first transmission resources is T.

In the above solution, the first transmission resource may be configured at a network side, which improves flexibility of system configuration, and facilitates flexible configuration of the first transmission resource according to a service requirement, and implementation of interference coordination between cells.

In the above solution, the first transmission resource may be configured through high-layer signaling. Alternatively, the first transmission resource may be configured through the high-layer signaling and triggered/disabled through Media Access Control (MAC)-layer signaling or physical-layer signaling.

In an implementation mode, the terminal receives a third signal before the terminal receives the first signal on the first transmission resource. The third signal is configured to indicate a transmission parameter for the first signal.

Furthermore, the transmission parameter for the first signal includes at least one of a transmission format, a sequence resource and a coding scheme.

In an example, the transmission format includes at least one of a sequence, a modulation symbol and a modulated sequence.

In an example, the sequence resource includes at least one of a root sequence generation parameter and a sequence cyclic shift.

In an example, a polar code is adopted in the coding scheme.

In the above solution, the network side provides the transmission parameter for the first signal to the terminal, and the terminal side receives the first signal according to the transmission parameter for the first signal, thereby reducing the complexity in signal detection.

In the above solution, the sequence in the transmission format is applied to transmission of a first signal with a small payload, and has the characteristics of low detection complexity and high detection accuracy.

In the above solution, the modulation symbol in the transmission format is applied to transmission of a first signal with a moderate/large payload.

In the above solution, the modulated sequence in the transmission format is applied to transmission of the first signal with the small payload, and has the characteristics of low detection complexity and high detection accuracy.

In the above solution, the polar code is adopted in the coding scheme, which avoids addition of a new coding scheme, and furthermore avoids increase of the complexity of the terminal.

In the above solution, a first part of parameters in the transmission parameter for the first signal are configured by the network, and a second part of parameters in the transmission parameter for the first signal are agreed in a protocol. Alternatively, all parameters in the transmission parameter for the first signal are configured by the network. Alternatively, all the parameters in the transmission parameter for the first signal are agreed in the protocol.

Herein, the transmission parameter (which may be a part of transmission parameters or all the transmission parameters) for the first signal is determined in a manner of the protocol agreement, thereby reducing the signaling overhead, and reducing the complexity in implementation of the terminal. The transmission parameter for the first signal (which is a part of transmission parameters or all the transmission parameters) is determined in a manner of network configuration, thereby increasing the system design flexibility.

In an implementation mode, the terminal receives a fourth signal before the terminal receives the first signal on the first transmission resource. The fourth signal is configured to indicate a time relationship between a time-domain resource of the first signal and a time-domain resource of stopping uplink transmission.

For example, the fourth signal is configured to indicate a time-domain offset of the time-domain resource of stopping uplink transmission relative to the time-domain resource of the first signal. If the terminal receives the first signal at a moment t1, the terminal may stop uplink transmission at a moment t1+Offset.

For another example, the fourth signal is configured to indicate that the time-domain resource of stopping uplink transmission is an Nth candidate time-domain resource subsequent to the first signal, N is a positive integer. Herein, the candidate time-domain resource is a time-domain resource capable of stopping uplink transmission.

Herein, a content carried in the fourth signal is only the time relationship rather than specific time-frequency resource information, thereby reducing a payload of the fourth signal.

In an implementation mode, the terminal receives a fifth signal before the terminal receives the first signal on the first transmission resource. The fifth signal is configured to indicate a time-frequency resource of stopping uplink transmission or a time-frequency resource set of stopping uplink transmission.

In the above solution of the embodiment of the disclosure, the time-frequency resource of stopping uplink transmission is one of: a whole system bandwidth of a specific symbol, a whole Band Width Part (BWP) of the specific symbol, a whole system bandwidth starting from the specific symbol, a whole BWP starting from the specific symbol, a partial system bandwidth of the specific symbol, a partial BWP of the specific symbol, a partial system bandwidth starting from the specific symbol and a partial BWP starting from the specific symbol.

Herein, the specific symbol refers to a specific time-domain resource, for example, an Orthogonal Frequency Division Multiplexing (OFDM) symbol.

For example, the time-frequency resource of stopping uplink transmission is a whole system bandwidth or a partial system bandwidth corresponding to a symbol 2.

For another example, the time-frequency resource of stopping uplink transmission is a whole system bandwidth or a partial system bandwidth starting from a symbol 4.

In the above solution of the embodiment of the disclosure, the first transmission resource is further configured to transmit a downlink signal except the first signal. Specifically, a content transmitted through the first transmission resource is determined by scheduling of the base station.

In the above solution of the embodiment of the disclosure, the second signal, the third signal, the fourth signal and the fifth signal include at least one of high-layer signaling, physical-layer signaling and MAC signaling. That is, the second signal, the third signal, the fourth signal and the fifth signal may be the high-layer signaling, or the physical-layer signaling, or the MAC signaling or any combination of the signaling.

In the above solution of the embodiment of the disclosure, the terminal receives the first signal on the first transmission resource when at least one of the following conditions is met.

There is data transmitted on the resource of stopping uplink transmission.

The terminal has a capability of detecting the first signal.

The terminal reports the capability of detecting the first signal.

With the technical solutions, the terminal receives the first signal configured to instruct to stop uplink transmission on the determined first transmission resource, thereby avoiding blind detection of the terminal for the first signal, reducing power consumption and complexity of the terminal caused by blind detection for the first signal.

FIG. 3 is a second flowchart of a method for signal transmission according to an embodiment of the disclosure. As shown in FIG. 3, the method for signal transmission includes the following operation.

In 301, a base station sends a first signal on a first transmission resource. The first signal is configured to instruct a terminal to stop uplink transmission.

In the embodiment of the disclosure, the base station may be, but be not limited to, a gNB in 5G.

In the embodiment of the disclosure, the base station sends the first signal to the terminal on the first transmission resource.

In the embodiment of the disclosure, the terminal may be any device capable of communicating with a network, such as a mobile phone, a tablet computer, a vehicle terminal device and a notebook computer.

In the embodiment of the disclosure, the first transmission resource is a determined transmission resource, and the base station sends the first signal on the determined transmission resource, and the terminal stops uplink transmission based on the first signal. Herein, the terminal receives the first signal only on the determined transmission resource, thereby avoiding blind detection of the terminal for the first signal, and reducing the complexity of the terminal.

In an implementation mode, the base station sends a second signal before the base station sends the first signal on the first transmission resource. The second signal is configured to indicate the first transmission resource.

Furthermore, the first transmission resource includes at least one of a time-domain resource, a frequency-domain resource or a code-domain resource.

Furthermore, the first transmission resource has a periodic characteristic on a time domain. Herein, the first transmission resource meets the periodic characteristic on the time domain, and a period of the first transmission resource may be 0, infinite or any value. If the period of the first transmission resource is infinite, it is indicated that the first transmission resource appears only once on the time domain. If the period of the first transmission resource is 0, it is indicated that the first transmission resource always appears on the time domain. If the period of the first transmission resource is any value, for example, T, it is indicated that a time interval between two adjacent first transmission resources is T.

In the above solution, the first transmission resource may be configured at a network side, which improves flexibility of system configuration, and facilitates flexible configuration of the first transmission resource according to a service requirement, and implementation of interference coordination between cells.

In the above solution, the first transmission resource may be configured through high-layer signaling. Alternatively, the first transmission resource may be configured through the high-layer signaling and triggered/disabled through Media Access Control (MAC)-layer signaling or physical-layer signaling.

In an implementation mode, the base station sends a third signal before the base station sends the first signal on the first transmission resource. The third signal is configured to indicate a transmission parameter for the first signal.

Furthermore, the transmission parameter for the first signal includes at least one of a transmission format, a sequence resource and a coding scheme.

In an example, the transmission format includes at least one of a sequence, a modulation symbol and a modulated sequence.

In an example, the sequence resource includes at least one of a root sequence generation parameter and a sequence cyclic shift.

In an example, a polar code is adopted in the coding scheme.

In the above solution, the network side provides the transmission parameter for the first signal to the terminal, and the terminal side receives the first signal according to the transmission parameter for the first signal, thereby reducing the complexity in signal detection.

In the above solution, the sequence in the transmission format is applied to transmission of a first signal with a small payload, and has the characteristics of low detection complexity and high detection accuracy.

In the above solution, the modulation symbol in the transmission format is applied to transmission of a first signal with a moderate/large payload.

In the above solution, the modulated sequence in the transmission format is applied to transmission of the first signal with the small payload, and has the characteristics of low detection complexity and high detection accuracy.

In the above solution, the polar code is adopted in the coding scheme, which avoids addition of a new coding scheme, and furthermore avoids increase of the complexity of the terminal.

In the above solution, a first part of parameters in the transmission parameter for the first signal are configured by the network, and a second part of parameters in the transmission parameter for the first signal are agreed in a protocol. Alternatively, all parameters in the transmission parameter for the first signal are configured by the network. Alternatively, all the parameters in the transmission parameter for the first signal are agreed in the protocol.

Herein, the transmission parameter (which may be a part of transmission parameters or all the transmission parameters) for the first signal is determined in a manner of the protocol agreement, thereby reducing the signaling overhead, and reducing the complexity in implementation of the terminal. The transmission parameter for the first signal (which is a part of transmission parameters or all the transmission parameters) is determined in a manner of network configuration, thereby increasing the system design flexibility.

In an implementation mode, the base station sends a fourth signal before the base station sends the first signal on the first transmission resource. The fourth signal is configured to indicate a time relationship between a time-domain resource of the first signal and a time-domain resource of stopping uplink transmission.

For example, the fourth signal is configured to indicate a time-domain offset of the time-domain resource of stopping uplink transmission relative to the time-domain resource of the first signal. If the terminal receives the first signal at a moment t1, the terminal may stop uplink transmission at a moment t1+Offset.

For another example, the fourth signal is configured to indicate that the time-domain resource of stopping uplink transmission is an Nth candidate time-domain resource subsequent to the first signal, N is a positive integer. Herein, the candidate time-domain resource is a time-domain resource capable of stopping uplink transmission.

Herein, a content carried in the fourth signal is only the time relationship rather than specific time-frequency resource information, thereby reducing a payload of the fourth signal.

In an implementation mode, the base station sends a fifth signal before the base station sends the first signal on the first transmission resource. The fifth signal is configured to indicate a time-frequency resource of stopping uplink transmission or a time-frequency resource set of stopping uplink transmission.

In the above solution of the embodiment of the disclosure, the time-frequency resource of stopping uplink transmission is one of: a whole system bandwidth of a specific symbol, a whole BWP of the specific symbol, a whole system bandwidth starting from the specific symbol, a whole BWP starting from the specific symbol, a partial system bandwidth of the specific symbol, a partial BWP of the specific symbol, a partial system bandwidth starting from the specific symbol and a partial BWP starting from the specific symbol.

Herein, the specific symbol refers to a specific time-domain symbol, for example, an OFDM symbol.

For example, the time-frequency resource of stopping uplink transmission is a whole system bandwidth or a partial system bandwidth corresponding to a symbol 2.

For another example, the time-frequency resource of stopping uplink transmission is a whole system bandwidth or a partial system bandwidth starting from a symbol 4.

In the above solution of the embodiment of the disclosure, the first transmission resource is further configured to transmit a downlink signal except the first signal. Specifically, a content transmitted through the first transmission resource is determined by scheduling of the base station.

In the above solution of the embodiment of the disclosure, the second signal, the third signal, the fourth signal and the fifth signal include at least one of high-layer signaling, physical-layer signaling and MAC signaling. That is, the second signal, the third signal, the fourth signal and the fifth signal may be the high-layer signaling, or the physical-layer signaling, or the MAC signaling or any combination of the signaling.

The technical solutions of the embodiments of the disclosure will further be explained and described below in combination with specific application examples.

First Application Example: Sequence-Based Instruction for Stopping Uplink Transmission The terminal determines a first transmission resource and receives a first signal on the first transmission resource. The first sequence is adopted for the first signal and the first sequence is configured to instruct to stop uplink transmission.

Herein, the first sequence may adopt an existing sequence in 5G NR, for example, a Zadoff-Chu (ZC) sequence, or a random sequence or an orthogonal sequence. The ZC sequence is a preferred sequence. A manner of generating the sequence is agreed in a 5G NR protocol. Furthermore, generation of a root sequence is related to a cell Identifier (ID), or a UE group ID or a high-layer configuration value. A cyclic shift value is agreed in the protocol or configured by a high layer (preferably, is configured by the high layer).

In an example, the base station configures u and v required by the root sequence of the ZC sequence and the cyclic shift value a through high-layer signaling.

The terminal detects the configured sequence on the determined transmission resource (i.e., the first transmission resource). If the configured sequence is detected, the terminal stops uplink transmission. Stopping of UL transmission is mapped to a specific time-frequency resource. A starting point of a time-domain resource is determined by a pre-configured time relationship between a sequence and a starting point (a starting point of stopping uplink transmission), and the pre-configured time relationship between the sequence and the starting point may be agreed in the protocol or configured through the high-layer signaling. A length of the time-domain resource is agreed through the high-layer signaling or in the protocol, for example, 2 symbols. A agreement value in the protocol may also be related to a subcarrier spacing. For example, if the subcarrier spacing is 15 KHz, the length of the time-domain resource is 2 symbols; and if the subcarrier spacing is 30 KHz, the length of the time-domain resource is 4 symbols. It may also be agreed in the protocol that the length of the time-domain resource is related to a sequence sending period. For example, the length of the time-domain resource is equal to the sequence sending period, both of which are 2 symbols. In such case, any symbol may be indicated. A frequency-domain resource is agreed to be for example, a whole BWP in the protocol, or configured, by the high layer, to be n Physical Resource Blocks (PRBs), or 1/N of a PRB or n1-n2 PRBs.

Second Application Example: Sequence-Based Resource Indication of Stopping Uplink Transmission A difference from the first application example is that a set of sequences are used to instruct to stop uplink transmission in the example. The set of sequences correspond to different time-frequency resources, or time-domain resources or frequency-domain resources respectively. In a case that a resource in a dimension (for example, a frequency-domain dimension or a time-domain dimension) is distinguished by a sequence, a manner of high-layer configuration or protocol agreement is adopted for a resource in another dimension (for example, the time-domain dimension or the frequency-domain dimension).

In an example, the frequency-domain resource takes subband or 1/N of a BWP as a granularity. The time-domain resource takes symbol as a unit. In case of different subcarrier spacing, the basic unit of the time-domain resource corresponds to different symbol numbers.

Figure 4A:
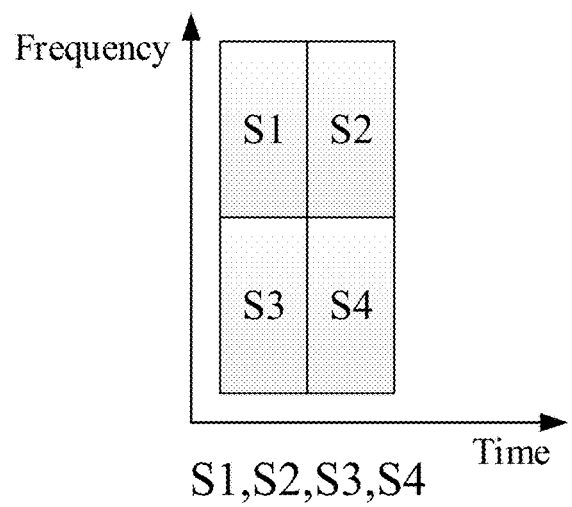
FIG. 4A is a first schematic diagram of indicating a preemption resource through a sequence according to an embodiment of the disclosure.
Figure 4B:
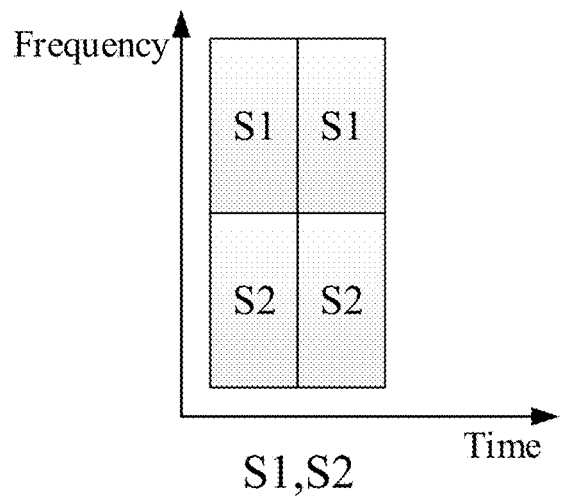
FIG. 4B is a second schematic diagram of indicating a preemption resource through a sequence according to an embodiment of the disclosure.
Figure 4C:
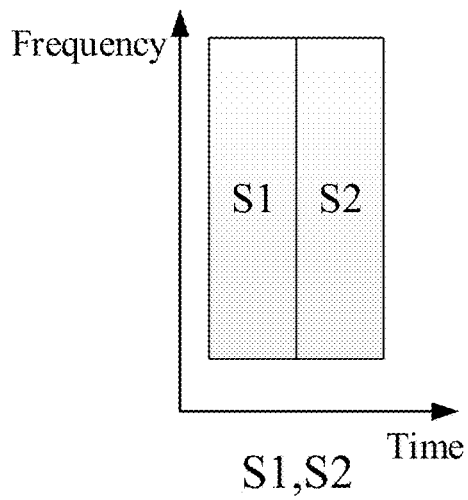
FIG. 4C is a third schematic diagram of indicating a preemption resource through a sequence according to an embodiment of the disclosure.

For example, taking FIG. 4A, FIG. 4B and FIG. 4C as an example, upon detecting a sequence S1, the terminal stops uplink transmission in a time-frequency domain corresponding to the S1. Furthermore, if a part of resources for a Transport Block (TB) are in the time-frequency domain corresponding to the S1, all transmission of the TB is stopped, or transmission subsequent to a time-domain starting point corresponding to the S1 is stopped.

Third Application Example:
Modulation-Symbol-Based Instruction of Stopping Uplink Transmission/Resource Indication of the Stopping Uplink Transmission Downlink control information (DCI), for example group common DCI is used to instruct to stop uplink transmission.

In a first method, when the resource of stopping uplink transmission is indicated by use of a modulation symbol, the terminal, before receiving the first signal, may configure a mapping relationship between DCI signaling and a resource through high-layer signaling, for example, as shown in Table 1.

TABLE 1

| DCI signaling | Time/frequency-domain resource |
| --- | --- |
| 00 | First resource in a preemption resource set |
| 01 | Second resource in a preemption resource set |
| 10 | Third resource in a preemption resource set |
| 11 | Fourth resource in a preemption resource set |

When the group common DCI is adopted, repetition coding may be considered, which not only improve the feasibility of the signaling, but also avoid imbalance of a valid information bit and a Cyclic Redundancy Check (CRC) bit. For example, when a second resource in a preemption resource set is indicated, 0101010101 are indicated.

In a second method, the DCI at least includes time-frequency resource indication information, like indication of scheduling of an uplink grant (UL grant)/downlink grant (DL grant) in 5G NR.

Fourth Application Example: The Determined First Transmission Resource

Figure 5A:
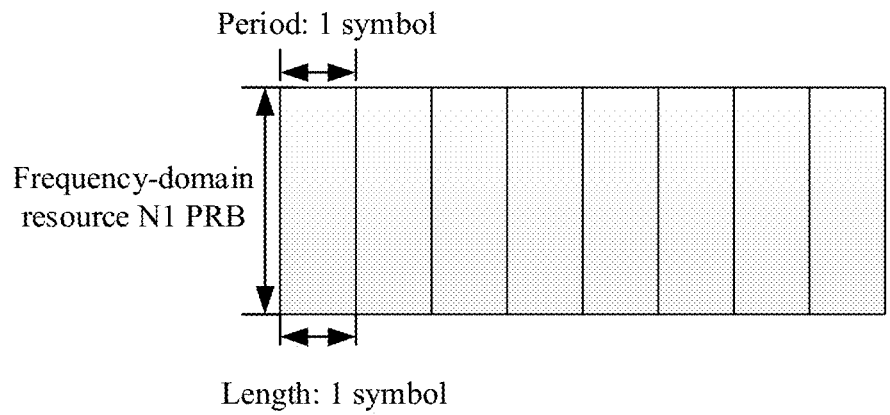
FIG. 5A is a first schematic diagram of configuration of a first transmission resource according to an embodiment of the disclosure.
Figure 5B:
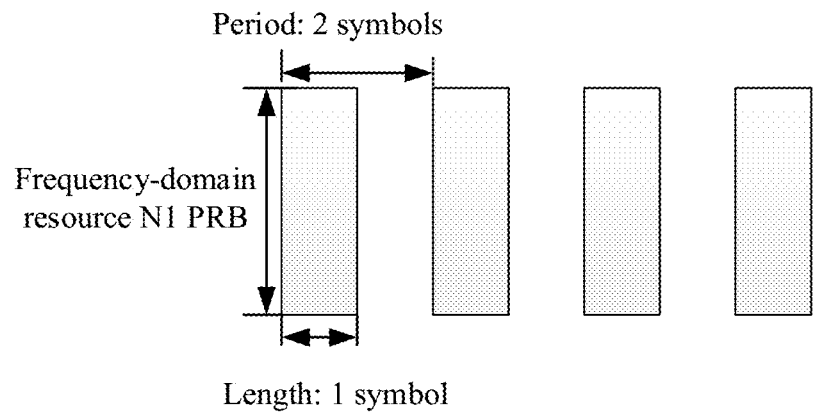
FIG. 5B is a second schematic diagram of configuration of a first transmission resource according to an embodiment of the disclosure.

In a first method, the terminal receives high-layer signaling for indicating the determined first transmission resource, referring to FIG. 5A and FIG. 5B, which includes at least one of the following information: a time period, a time-domain starting point, a time-domain width of the signaling and a frequency-domain resource.

In a second method, the terminal receives the high-layer signaling. The high-layer signaling indicates a region detected by a preemption indicator which starts from a first Control Channel Element (CCE) or N1-th and N2-th CCEs of a common search space having an aggregation level 8.

Fifth Application Example: A Time Relationship Between the Time-Domain Resource of the First Signal and the Time-Domain Resource of Stopping Uplink Transmission The time relationship between the time-domain resource of the first signal and the time-domain resource of stopping uplink transmission is configured by the high layer. In the configuration, scheduling of the base station and processing time for data preparation/uplink transmission stopping of the terminal are taken into account. For example, the base station refers to a processing capability K2 of the terminal, and a time interval between the time-domain resource of the first signal and the time-domain resource of stopping uplink transmission is required to be greater than K2.

When the time relationship between the time-domain resource of the first signal and the time-domain resource of stopping uplink transmission is k symbols the terminal stops uplink transmission after n+k upon receiving signaling on an nth symbol.

Figure 6:
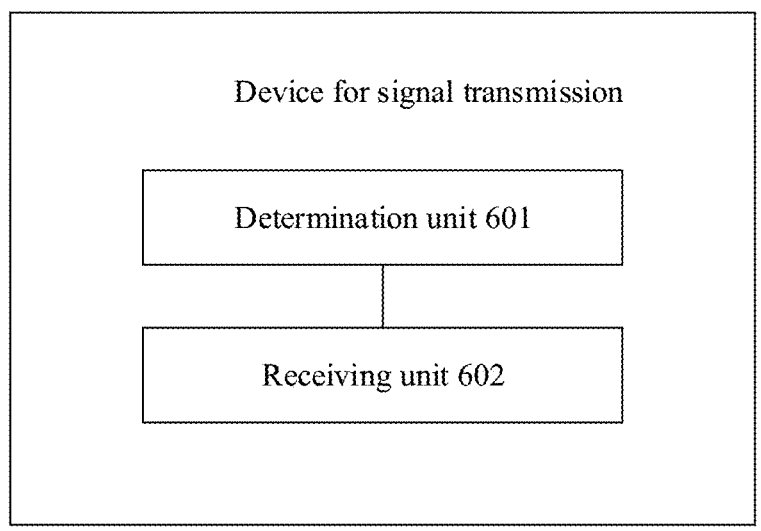
FIG. 6 is a first structure composition diagram of a device for signal transmission according to an embodiment of the disclosure.

FIG. 6 is a first structure composition diagram of a device for signal transmission according to an embodiment of the disclosure. As shown in FIG. 6, the device for signal transmission includes a determination unit 601 and a receiving unit 602.

The determination unit 601 is configured to determine a first transmission resource.

The receiving unit 602 is configured to receive a first signal on the first transmission resource. The first signal is configured to instruct to stop uplink transmission.

In an implementation mode, the receiving unit 602 receives a second signal before the receiving unit 602 receives the first signal on the first transmission resource. The second signal is configured to indicate the first transmission resource.

In an implementation mode, the first transmission resource includes at least one of a time-domain resource, a frequency-domain resource or a code-domain resource.

In an implementation mode, the first transmission resource has a periodic characteristic on a time domain.

In an implementation mode, the second signal includes at least one of high-layer signaling, physical-layer signaling or MAC signaling.

In an implementation mode, the receiving unit 602 receives a third signal before the receiving unit 602 receives the first signal on the first transmission resource. The third signal is configured to indicate a transmission parameter for the first signal.

In an implementation mode, the transmission parameter for the first signal includes at least one of a transmission format, a sequence resource and a coding scheme.

In an implementation mode, the transmission format includes at least one of a sequence, a modulation symbol and a modulated sequence.

In an implementation mode, the sequence resource includes at least one of a root sequence generation parameter and a sequence cyclic shift.

In an implementation mode, a polar code is adopted in the coding scheme.

In an implementation mode, a first part of parameters in the transmission parameter for the first signal are configured by a network, and a second part of parameters in the transmission parameter for the first signal are predetermined in a protocol.

Alternatively, all parameters in the transmission parameter for the first signal are configured by the network.

Alternatively, all the parameters in the transmission parameter for the first signal are agreed in the protocol.

In an implementation mode, the third signal includes at least one of high-layer signaling, physical-layer signaling and MAC signaling.

In an implementation mode, the receiving unit 602 receives a fourth signal before the receiving unit 602 receives the first signal on the first transmission resource.

The fourth signal is configured to indicate a time relationship between a time-domain resource of the first signal and a time-domain resource of stopping uplink transmission.

In an implementation mode, the fourth signal includes at least one of high-layer signaling, physical-layer signaling and MAC signaling.

In an implementation mode, the receiving unit 602 receives a fifth signal before the receiving unit 602 receives the first signal on the first transmission resource. The fifth signal is configured to indicate a time-frequency resource of stopping uplink transmission or a time-frequency resource set of stopping uplink transmission.

In an implementation mode, the fifth signal includes at least one of high-layer signaling, physical-layer signaling and MAC signaling.

In an implementation mode, the time-frequency resource of stopping uplink transmission is one of: a whole system bandwidth of a specific symbol, a whole Band Width Part (BWP) of the specific symbol, a whole system bandwidth starting from the specific symbol, a whole BWP starting from the specific symbol, a partial system bandwidth of the specific symbol, a partial BWP of the specific symbol, a partial system bandwidth starting from the specific symbol and a partial BWP starting from the specific symbol.

In an implementation mode, the first transmission resource is further configured to transmit a downlink signal except the first signal.

In an implementation mode, the receiving unit 602 receives the first signal on the first transmission resource in a case that at least one of the following conditions is met.

There is data transmitted on the resource of stopping uplink transmission.

A terminal has a capability of detecting the first signal.

The terminal reports the capability of detecting the first signal.

It is understood by those skilled in the art that the related descriptions about the above device for signal transmission of the embodiments of the disclosure may be understood with reference to the related descriptions about the method for signal transmission of the embodiments of the disclosure.

Figure 7:
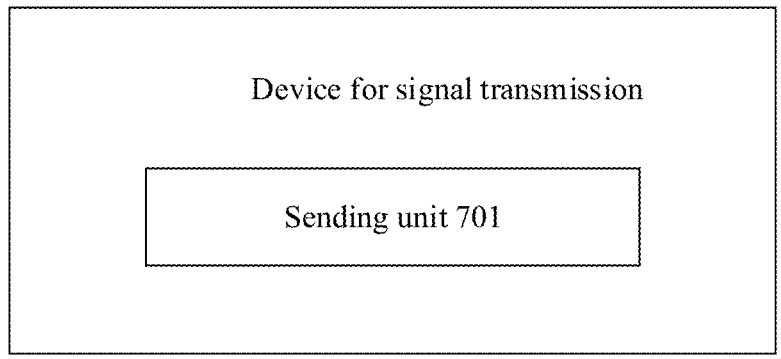
FIG. 7 is a second structure composition diagram of a device for signal transmission according to an embodiment of the disclosure.

FIG. 7 is a second structure composition diagram of a device for signal transmission according to an embodiment of the disclosure. As shown in FIG. 7, the device for signal transmission includes a sending unit 701.

The sending unit 701 is configured to send a first signal on a first transmission resource. The first signal is configured to instruct a terminal to stop uplink transmission.

In an implementation mode, the sending unit 701 sends a second signal before the sending unit 701 sends the first signal on the first transmission resource. The second signal is configured to indicate the first transmission resource.

In an implementation mode, the first transmission resource includes at least one of a time-domain resource, a frequency-domain resource and a code-domain resource.

In an implementation mode, the first transmission resource has a periodic characteristic on a time domain.

In an implementation mode, the second signal includes at least one of high-layer signaling, physical-layer signaling and MAC signaling.

In an implementation mode, the sending unit 701 sends a third signal before the sending unit 701 sends the first signal on the first transmission resource. The third signal is configured to indicate a transmission parameter for the first signal.

In an implementation mode, the transmission parameter for the first signal includes at least one of a transmission format, a sequence resource and a coding scheme.

In an implementation mode, the transmission format includes at least one of a sequence, a modulation symbol and a modulated sequence.

In an implementation mode, the sequence resource includes at least one of a root sequence generation parameter and a sequence cyclic shift.

In an implementation mode, a polar code is adopted in the coding scheme.

In an implementation mode, a first part of parameters in the transmission parameter for the first signal are configured by a network, and a second part of parameters in the transmission parameter for the first signal are agreed in a protocol.

Alternatively, all parameters in the transmission parameter for the first signal are configured by the network.

Alternatively, all the parameters in the transmission parameter for the first signal are agreed in the protocol.

In an implementation mode, the third signal includes at least one of high-layer signaling, physical-layer signaling and MAC signaling.

In an implementation mode, the sending unit 701 sends a fourth signal before the sending unit 701 sends the first signal on the first transmission resource. The fourth signal is configured to indicate a time relationship between a time-domain resource of the first signal and a time-domain resource of stopping uplink transmission.

In an implementation mode, the fourth signal includes at least one of high-layer signaling, physical-layer signaling and MAC signaling.

In an implementation mode, the sending unit 701 sends a fifth signal before the sending unit 701 sends the first signal on the first transmission resource. The fifth signal is configured to indicate a time-frequency resource of stopping uplink transmission or a time-frequency resource set of stopping uplink transmission.

In an implementation mode, the fifth signal includes at least one of high-layer signaling, physical-layer signaling and MAC signaling.

In an implementation mode, the time-frequency resource of stopping uplink transmission is one of: a whole system bandwidth of a specific symbol, a whole BWP of the specific symbol, a whole system bandwidth starting from the specific symbol, a whole BWP starting from the specific symbol, a partial system bandwidth of the specific symbol, a partial BWP of the specific symbol, a partial system bandwidth starting from the specific symbol and a partial BWP starting from the specific symbol.

In an implementation mode, the first transmission resource is further configured to transmit a downlink signal except the first signal.

It is understood by those skilled in the art that the related descriptions about the device for signal transmission of the embodiments of the disclosure may be understood with reference to the related descriptions about the above method for signal transmission of the embodiments of the disclosure.

Figure 8:
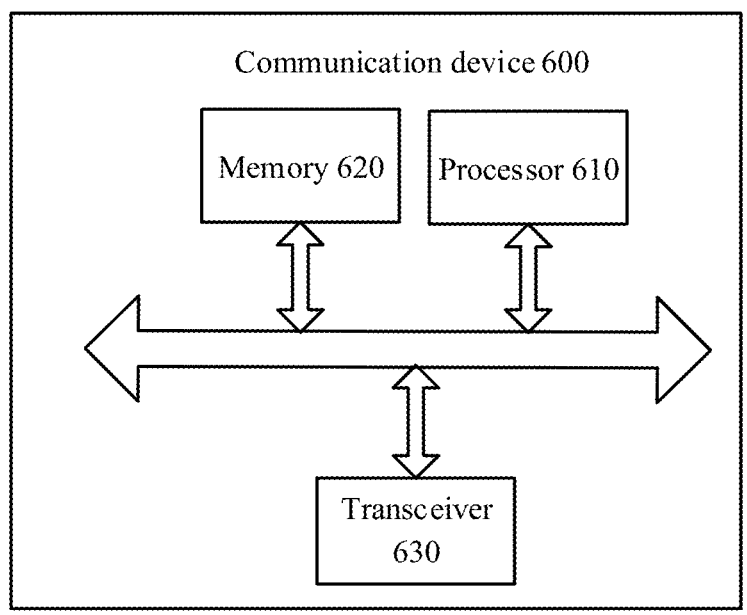
FIG. 8 is a schematic structural diagram of a communication device according to an embodiment of the disclosure.

FIG. 8 is a schematic structure diagram of a communication device 600 according to an embodiment of the disclosure. The communication device may be a terminal and may also be a network device (for example, a base station). The communication device 600 shown in FIG. 8 includes a processor 610. The processor 610 may call and run a computer program in a memory to implement the method in the embodiments of the disclosure.

Optionally, as shown in FIG. 8, the communication device 600 may further include a memory 620. The processor 610 may call and run the computer program in the memory 620 to implement the method in the embodiments of the disclosure.

The memory 620 may be a separate device independent of the processor 610 and may also be integrated into the processor 610.

Optionally, as shown in FIG. 8, the communication device 600 may further include a transceiver 630, and the processor 610 may control the transceiver 630 to communicate with another device, specifically sending information or data to another device or receiving information or data sent by the another device.

The transceiver 630 may include a transmitter and a receiver. The transceiver 630 may further include an antenna, and the number of the antennas may be one or more.

Optionally, the communication device 600 may be a network device of the embodiment of the disclosure, and the communication device 600 may implement corresponding flows implemented by the network device in each method of the embodiments of the disclosure. For simplicity, elaborations are omitted herein.

Optionally, the communication device 600 may be a terminal device/terminal of the embodiment of the disclosure, and the communication device 600 may implement corresponding flows implemented by the mobile terminal/terminal in each method of the embodiments of the disclosure. For simplicity, elaborations are omitted herein.

Figure 9:
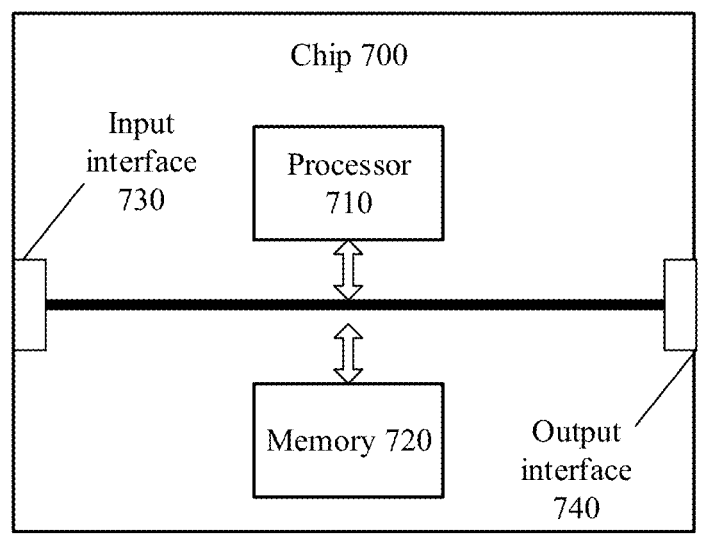
FIG. 9 is a schematic structural diagram of a chip according to another embodiment of the disclosure.

FIG. 9 is a schematic structural diagram of a chip according to another embodiment of the disclosure. The chip 700 shown in FIG. 9 includes a processor 1710, and the processor 710 may call and run a computer program in a memory to implement the method in the embodiments of the disclosure.

Optionally, as shown in FIG. 9, the chip 700 may further include the memory 720. The processor 710 may call and run the computer program in the memory 720 to implement the method in the embodiments of the disclosure.

The memory 720 may be a separate device independent of the processor 710 and may also be integrated into the processor 710.

Optionally, the chip 700 may further include an input interface 730. The processor 710 may control the input interface 730 to communicate with another device or chip, specifically acquiring information or data sent by the another device or chip.

Optionally, the chip 700 may further include an output interface 740. The processor 710 may control the output interface 740 to communicate with another device or chip, specifically outputting information or data sent by the other device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the terminal device/terminal of the embodiments of the disclosure, and the chip may implement corresponding flows implemented by the terminal device/terminal in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 10:
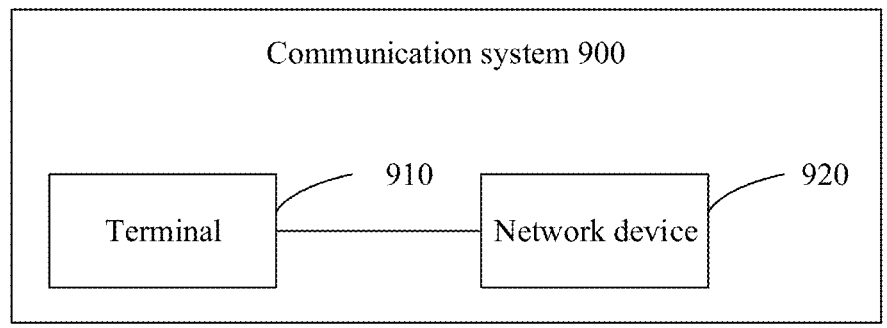
FIG. 10 is a schematic block diagram of a communication system according to an embodiment of the disclosure.

FIG. 10 is a schematic block diagram of a communication system 900 according to an embodiment of the disclosure. As shown in FIG. 10, a communication system 900 includes a terminal device 910 and a network device 920.

The terminal device 910 may be configured to realize corresponding functions realized by the terminal device in the above method, and the network device 920 may be configured to realize corresponding functions realized by the network device in the above method. For simplicity, elaborations are omitted herein.

It is to be understood that the processor in the embodiment of the disclosure may be an integrated circuit chip and has a signal processing capability. In an implementation process, each step of the above method embodiments may be implemented by an integrated logical circuit of hardware in the processor or an instruction in a software form. The above processor may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and implements the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but be not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal in the embodiments of the disclosure, and the computer program enables a computer to execute corresponding flows implemented by a mobile terminal/the terminal in each method of the embodiments of the disclosure. For simplicity, elaborations are omitted herein.

The embodiments of the disclosure further provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal in the embodiments of the disclosure, and the computer program instruction enables the computer to execute corresponding flows implemented by the mobile terminal/terminal in each method of the embodiments of the disclosure. For simplicity, elaborations are omitted herein.

The embodiments of the disclosure further provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal in the embodiments of the disclosure, and the computer program runs in the computer to enable the computer to execute corresponding flows implemented by the mobile terminal/terminal in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that regarding specific operation processes of the system, device and unit described above, reference may be made to the corresponding processes in the above method embodiment, and elaborations are omitted herein for convenient and brief description.

In some embodiments provided by the disclosure, it is to be understood that the disclosed system, device and method may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, displayed or discussed coupling or direct coupling or communication connection may be indirect coupling or communication connection implemented through some interfaces, the device or the units, and may be electrical and mechanical or in other forms.

The units described as separate parts may or may not be physically separated, and parts displayed as units may or may not be physical units, and namely may be located in the same place, or may also be distributed to multiple network units. A part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being implemented in form of software functional unit and sold or used as an independent product, the function may also be stored in a computer-readable storage medium. Based on such an understanding, an essential part of the technical solutions in the disclosure, a part of the technical solutions making contributions to the prior art, or a part of the technical solutions may be embodied in a form of a software product. The computer software product is stored in a storage medium and includes several instructions configured to enable a computer device (which may be a personal computer, a server, a network device or the like) to execute all or a part of the operations of the method in each embodiment of the disclosure. The above-mentioned storage medium includes: various media capable of storing program codes such as a U disk, a mobile hard disk, a Read-Only Memory (ROM), a Random Access Memory (RAM), a magnetic disk and an optical disk.

The foregoing is only the specific embodiments of the disclosure, and the scope of protection of the disclosure is not limited thereto. Any variations or replacements easily appreciated by those skilled in the art within the technical scope disclosed by the disclosure shall fall within the scope of protection of the disclosure. Therefore, the scope of protection of the disclosure shall conform to the scope of protection of the claims.

The invention claimed is:

1. A method for signal transmission, comprising:
receiving, by a terminal, a second signal, the second signal being configured to indicate a first transmission resource, and the first transmission resource comprising at least one of a time-domain resource, a frequency-domain resource or a code-domain resource;
receiving, by the terminal, a first signal on the first transmission resource, the first signal being configured to instruct to stop uplink transmission; and
stopping, by the terminal in response to the first signal, uplink transmission on the time-domain resource of stopping uplink transmission obtained based on the first transmission resource and a preconfigured time relationship between a starting point of the time-domain resource of stopping uplink transmission and a sequence of the first signal transmitted on the first transmission resource, or correspondences between time-domain resources of stopping uplink transmission and sequences of the first signal transmitted on the first transmission resource.

2. The method of claim 1, wherein the first transmission resource has a periodic characteristic on a time domain.

3. The method of claim 1, wherein the second signal comprises at least one of high-layer signaling, physical-layer signaling or Media Access Control (MAC) signaling.

4. The method of claim 1, further comprising: before the receiving, by the terminal, the first signal on the first transmission resource,
receiving, by the terminal, a fourth signal, the fourth signal being configured to indicate a time relationship between a time-domain resource for the first signal and a time-domain resource of stopping uplink transmission.

5. The method of claim 4, wherein the fourth signal comprises at least one of high-layer signaling, physical-layer signaling or Media Access Control (MAC) signaling.

6. The method of claim 1, further comprising: before the receiving, by the terminal, the first signal on the first transmission resource,
receiving, by the terminal, a fifth signal, the fifth signal being configured to indicate a time-frequency resource of stopping uplink transmission or a time-frequency resource set of stopping uplink transmission.

7. The method of claim 6, wherein the fifth signal comprises at least one of high-layer signaling, physical-layer signaling or Media Access Control (MAC) signaling.

8. The method of claim 6, wherein the time-frequency resource of stopping uplink transmission is one of:
a whole system bandwidth of a specific symbol, a whole Band Width Part (BWP) of the specific symbol, a whole system bandwidth starting from the specific symbol, a whole BWP starting from the specific symbol, a partial system bandwidth of the specific symbol, a partial BWP of the specific symbol, a partial system bandwidth starting from the specific symbol and a partial BWP starting from the specific symbol.

9. A method for signal transmission, comprising:
sending, by a base station, a second signal, the second signal being configured to indicate a first transmission resource, and the first transmission resource comprising at least one of a time-domain resource, a frequency-domain resource or a code-domain resource; and
sending, by the base station, a first signal on the first transmission resource, the first signal being configured to instruct a terminal to stop uplink transmission, wherein in response to the first signal, the base station instructs the terminal to stop uplink transmission on the time-domain resource of stopping uplink transmission obtained based on the first transmission resource and a preconfigured time relationship between a starting point of the time-domain resource of stopping uplink transmission and a sequence of the first signal transmitted on the first transmission resource, or correspondences between time-domain resources of stopping uplink transmission and sequences of the first signal transmitted on the first transmission resource.

10. The method of claim 9, wherein the first transmission resource has a periodic characteristic on a time domain.

11. The method of claim 9, wherein the second signal comprises at least one of high-layer signaling, physical-layer signaling or Media Access Control (MAC) signaling.

12. The method of claim 9, further comprising: before the sending, by the base station, the first signal on the first transmission resource,
sending, by the base station, a fourth signal, the fourth signal being configured to indicate a time relationship between a time-domain resource for the first signal and a time-domain resource of stopping uplink transmission.

13. The method of claim 12, wherein the fourth signal comprises at least one of high-layer signaling, physical-layer signaling or Media Access Control (MAC) signaling.

14. The method of claim 9, further comprising: before the sending, by the base station, the first signal on the first transmission resource,
sending, by the base station, a fifth signal, the fifth signal being configured to indicate a time-frequency resource of stopping uplink transmission or a time-frequency resource set of stopping uplink transmission.

15. The method of claim 14, wherein the fifth signal comprises at least one of high-layer signaling, physical-layer signaling or Media Access Control (MAC) signaling.

16. The method of claim 14, wherein the time-frequency resource of stopping uplink transmission is one of:
a whole system bandwidth of a specific symbol, a whole Band Width Part (BWP) of the specific symbol, a whole system bandwidth starting from the specific symbol, a whole BWP starting from the specific symbol, a partial system bandwidth of the specific symbol, a partial BWP of the specific symbol, a partial system bandwidth starting from the specific symbol or a partial BWP starting from the specific symbol.

17. A device for signal transmission, comprising:
a processor;
a memory, configured to store a computer program; and
a transceiver,
wherein the processor is configured to call and run the computer program stored in the memory to control the transceiver to:
receive a second signal, the second signal being configured to indicate a first transmission resource, and the first transmission resource comprising at least one of a time-domain resource, a frequency-domain resource or a code-domain resource;
receive a first signal on the first transmission resource, the first signal being configured to instruct to stop uplink transmission; and
stop uplink transmission on the time-domain resource of stopping uplink transmission obtained based on the first transmission resource and a preconfigured time relationship between a starting point of the time-domain resource of stopping uplink transmission and a sequence of the first signal transmitted on the first transmission resource, or correspondences between time-domain resources of stopping uplink transmission and sequences of the first signal transmitted on the first transmission resource.

18. The device of claim 17, wherein the first transmission resource has a periodic characteristic on a time domain.

19. The device of claim 17, wherein the second signal comprises at least one of high-layer signaling, physical-layer signaling or Media Access Control (MAC) signaling.

20. The device of claim 17, wherein the receiving unit is configured to receive a fourth signal before receiving the first signal on the first transmission resource, the fourth signal being configured to indicate a time relationship between a time-domain resource for the first signal and a time-domain resource of stopping uplink transmission.

* * * * *